United States Patent
Tsuchida et al.

(10) Patent No.: US 10,853,740 B2
(45) Date of Patent: Dec. 1, 2020

(54) NATURAL LANGUAGE INTERFACE TO INTERACTIVE, OPERATING-SYSTEM SHELL AND TECHNIQUES FOR CREATING TRAINING DATA FOR THE SAME

(71) Applicant: Microsoft Technology Licensing, LLC, Redmond, WA (US)

(72) Inventors: Derek K. Tsuchida, Kirkland, WA (US); Harry P. Ferguson, Seattle, WA (US); Kevin T. Brown, Kirkland, WA (US); Jeffrey E. Steinbok, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 754 days.

(21) Appl. No.: 15/631,480

(22) Filed: Jun. 23, 2017

(65) Prior Publication Data

US 2018/0373998 A1 Dec. 27, 2018

(51) Int. Cl.
*G06N 20/00* (2019.01)
*G06F 8/73* (2018.01)

(52) U.S. Cl.
CPC ............ *G06N 20/00* (2019.01); *G06F 8/73* (2013.01)

(58) Field of Classification Search
None
See application file for complete search history.

(56) References Cited

U.S. PATENT DOCUMENTS

| | | | |
|---|---|---|---|
| 7,558,778 B2* | 7/2009 | Carus | G06N 20/00 |
| 9,244,510 B1* | 1/2016 | Conrad | G06F 11/30 |
| 9,589,578 B1 | 3/2017 | Dippenaar | |
| 2011/0276598 A1* | 11/2011 | Kozempel | G06F 16/3344 |
| | | | 707/770 |
| 2014/0006012 A1 | 1/2014 | Zhou et al. | |

(Continued)

OTHER PUBLICATIONS

Standefer, et al., "Add intelligence to bots with Cognitive Services", https://docs.microsoft.com/en-us/bot-framework/cognitive-services-bot-intelligence-overview, Retrieved on: May 15, 2017, 6 pages.

(Continued)

*Primary Examiner* — Alan Chen
(74) *Attorney, Agent, or Firm* — Michael Best & Friedrich LLP

(57) ABSTRACT

Systems and methods for creating training data for a software application that executes automated tasks such as operating system shell. One example provides a system that comprises at least one electronic processor configured to access a file repository that contains programming files. The electronic processor is also configured to extract data from documentation associated with at least one of the programming files to generate extracted data, extract attributes associated with at least one of the programming files to generate extracted attributes, convert the extracted data and the extracted attributes to training data, and store the training data in a training data repository. The electronic processor is also configured to update the documentation and attributes in the programming files (for example, by providing a user interface to allow a user to do so or in another fashion).

18 Claims, 4 Drawing Sheets

(56) References Cited

U.S. PATENT DOCUMENTS

| | | | |
|---|---|---|---|
| 2015/0178392 A1* | 6/2015 | Jockisch | G06F 16/9535 707/706 |
| 2016/0044380 A1 | 2/2016 | Barrett | |
| 2016/0189717 A1 | 6/2016 | Kannan et al. | |
| 2017/0068659 A1 | 3/2017 | Rothwell et al. | |
| 2017/0132190 A1 | 5/2017 | Koutrika et al. | |
| 2018/0373507 A1* | 12/2018 | Mizrahi | G06F 16/951 |

OTHER PUBLICATIONS

"A Review of Natural Language APIs for Bots", https://medium.com/@Conversate/natural-language-apis-for-bots-e791f090e32f, Published on: May 3, 2016, 7 pages.

Nikita, "The Best NLP (Language understanding) tools to make your chatbot smarter", https://tutorials.botsfloor.com/the-best-nlp-language-understanding-tools-to-make-your-chatbot-smarter-d6db34fbe90d, Jan. 20, 2017, 8 pages.

* cited by examiner

NATURAL LANGUAGE INTERFACE TO INTERACTIVE, OPERATING-SYSTEM SHELL AND TECHNIQUES FOR CREATING TRAINING DATA FOR THE SAME

FIELD

Embodiments described herein relate to creating training data for software applications that assist developers in discovering and selecting software tools.

SUMMARY

Software developers utilize a wide variety of software tools and services to support software development, testing, and other tasks. These tools and services often change in terms of their functionality and how they are used. In addition, new tools and services become available frequently which complicates the ability of software developers to locate and make use of the number and types of software tools and services available. Software developer would benefit from an automated tool that provides ways to discover new software tools and services accompanied by information about the functions the located software tools perform, and how to use the tools.

When faced with a task that could be solved by an existing software tool or service, a software developer may manually search resources. In contrast, embodiments of the invention provide, among other things, a mechanism to search code repositories (file systems containing source code), review attributes associated with executable tools or services (notes describing the functionality provided by the tool or service), or both to locate tool or service relevant to the need at hand. In one instance, a natural language interface to an interactive shell program (for example, PowerShell software) is provided. The search begins with a question, posed in natural language by a software developer that includes a description of the functionality needed. Keywords may be extracted from the question and used to drive the search. For example, the question "Is there a function to upload files to a cloud storage location?" might be posed by a developer seeking a software tool to transfer files to a remote file server within a cloud service. This question may lead to a search using the keywords "upload" and "file." One embodiment provides a system that analyzes a question posed by a developer, uses this analysis to search for software tools and services that may assist the developer, and provides a list of potential software tools or services that answer the question or provide the functionality described in the question. The system helps improve the software developer's ability to locate and utilize existing software tools and services. In one embodiment, the system also receives updates regarding changes to existing software tools and services as well as new tools and services as they are developed. In some instances, the system uses feedback from software developers to improve the analysis which improves the accuracy of the list of potentially useful software tools and services presented to the user, where accuracy may be assessed by the developer's use of one of the output functions.

The accuracy of a system for analyzing questions posed by software developers often depends on training data provided to the system. Training data creates, within the analysis system, a set of relationships between questions or portions of questions and data that guides the system in selecting the list of potentially useful software tools and services. More accurate training data typically leads to more accurate relationships and thus more accurate results. Embodiments of the system described herein create and update training data extracted from comments in files containing source code (for example, comments in C #, Java, PHP, and other programming languages) and extracted from attributes associated with functionality available in files containing executable code (for example dynamic link libraries, restful application program interfaces, and other executable files of object or machine code). As software developers use the system, the developers may add to the comments in files of source code, add attributes to executable code, or both, in order to update the data used to create training. In addition, embodiments of the system described herein may gather data related to software developer interaction with the system and the list of potential software tools and services. The interaction data is used by the system to improve the accuracy of the list provided to the developer.

One embodiment provides a system for creating training data for a software application that executes automated tasks (for example, an interactive, operating-system shell program). In one embodiment, the system includes at least one electronic processor configured to access a file repository that contains programming files, extract data from documentation associated with at least one of the programming files to generate extracted data, and extract attributes associated with at least one of the programming files to generate extracted attributes. The electronic processor is also configured to convert the extracted data and the extracted attributes to training data, store the training data in a training data repository, and update the documentation and attributes in the programming files.

Another embodiment provides a method of creating training data for a software application that executes automated tasks. The method includes accessing, with one or more electronic processors, a file repository that contains programming files; extracting, with the one or more electronic processors, data from documentation associated with at least one of the programming files to generate extracted data; and extracting, with the one or more electronic processors, attributes associated with at least one of the programming files to generate extracted attributes. The method also includes converting, with one or more electronic processors, the extracted data and the extracted attributes to training data; storing the training data in a training data repository; and updating the documentation and attributes in the programming files.

DETAILED DESCRIPTION

Figure 1:
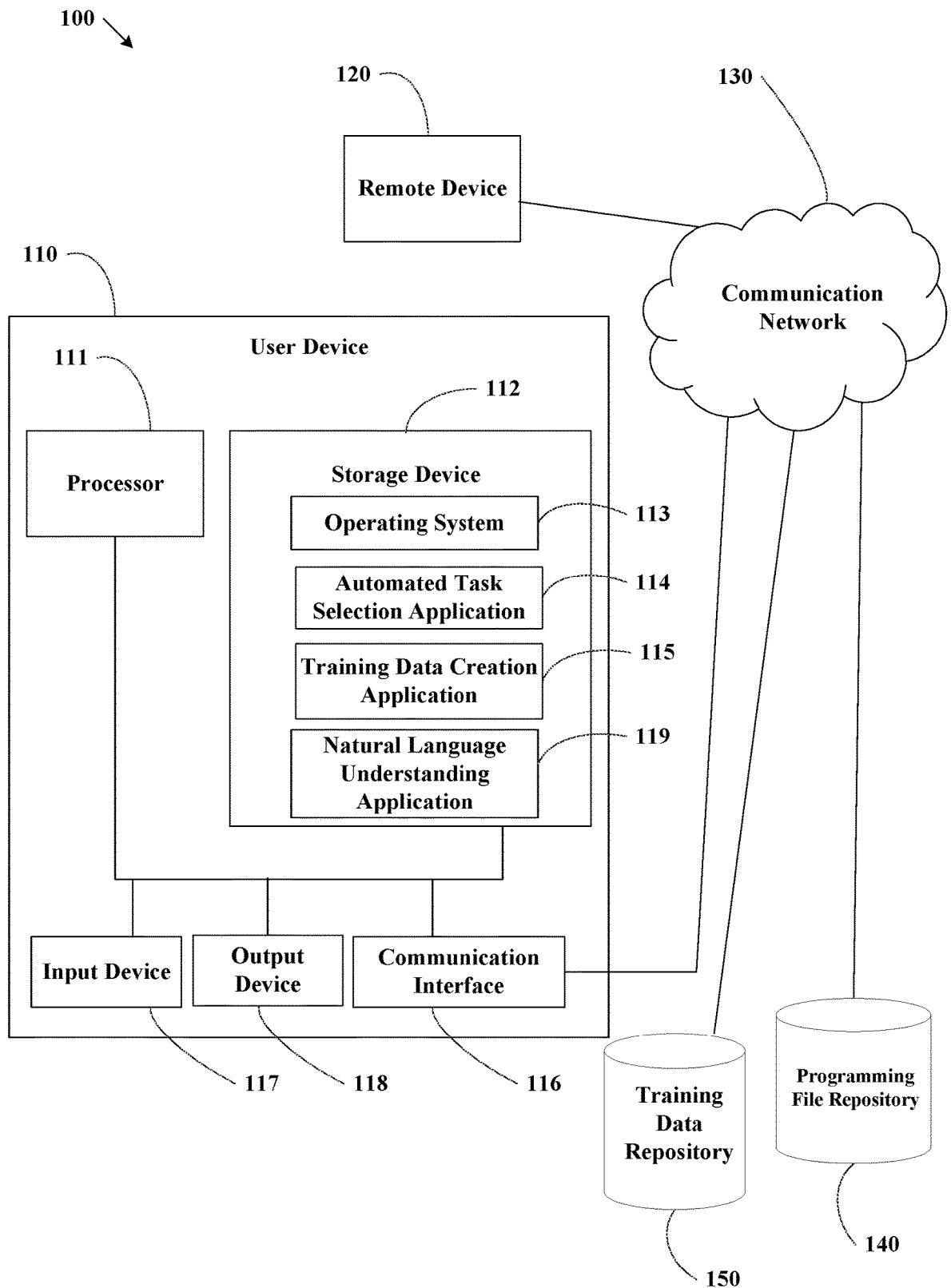
FIG. 1 schematically illustrates a system for creating and updating training data for use in a natural language understanding application used to search for software tools and services.

One or more embodiments are described and illustrated in the following description and accompanying drawings. These embodiments are not limited to the specific details provided herein and may be modified in various ways. Other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable media. Similarly, embodiments described herein may be implemented as a non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As noted above, systems that analyze natural language often rely on training data to generate output. Training data may include sample user input and associations between the sample user input and desired output. A system using training data analyzes user input, maps the user input to the sample user input in the training data, and produces output by presenting the user with the output associated with sample user input in the training data. The training data may be extracted from a larger data set of sample user input and associated output, where the larger data set includes training data and associations from the training data to desired output, but use of the larger data set is not feasible due to computation time, complexity, or the inability of the larger data set to improve the accuracy of the output beyond the accuracy produced by the smaller, sample training data. One challenge associating with selecting the sample training data stems from choosing a subset of training data from the larger data set that produces desired output and improving the training data over time as the system utilizing the training data is used.

When a user interacts with a system that analyzes natural language, the user may provide feedback as to the accuracy of the system in one of two ways. Direct feedback may be provided, for example, by adjusting or influencing the associations between the sample user input and the associated output. Indirect feedback may be provided, for example, by the system capturing actions taken by the user in response to the output presented to the user. Certain embodiments described herein, provide a system using natural language analysis that accumulates user feedback and analyzes the accumulated feedback before adjusting the training data. Alternatively, some embodiments use analysis of user feedback to adjust the training set. In some instances, both techniques are used to improve accuracy.

When a developer identifies the need for a software tool or service, as described previously, the developer may search source code files for software modules (a software function, procedure, method, or the like that provides one or more functions), or search through attributes of executable code for functions that meet the developer's needs. In some embodiments of the system described, the developer poses a question to the system and receives (as output) a list of functions that may meet the developer's needs, where the system analyzes the question using a natural language system dependent upon training data.

As described in more detail below, some embodiments create training data from the comments within source code files, attributes associated with executable files, or both, rather than selecting training data from a larger data set. Creating the training data may include, for example, extracting comments from a source code file, converting the comments to a format usable by a natural language system, specifying the associated desired output, and improving the training data by recreating the training data when the underlying source code, executable code, or both change. Recognizing that when a software developer creates or alters a software module, the developer often places comments in the source code and attributes that are associated with the executable code, and that these comments and attributes often contain answers to questions posed by other software developers when searching for software tools and services, embodiments of the system described herein create training data from these comments and attributes.

FIG. 1 illustrates a system 100 for creating training data from the comments in source code, attributes associated with the executable code, or both. In the example illustrated in FIG. 1, the system 100 includes a user device 110. The user device 110 may be a laptop or desktop computer, a tablet computer, a smart telephone, a smart television, or another type of computing device. The user device 110 includes an electronic processor 111 and a storage device 112. As will be discussed in greater detail, the storage device 112 stores software including an operating system 113, an automated task selection application 114, and a training data creation application 115.

The user device 110 also includes a communication interface 116, an input device 117, and an output device 118. The electronic processor 111, the storage device 112, the communication interface 116, the input device 117, and the output device 118 communicate over one or more communication lines or buses, wireless connections, or a combination thereof. It should be understood that, in various configurations, the user device 110 may include additional or alternative components than those illustrated in FIG. 1 and may perform additional functions than the functionality described herein. For example, in some embodiments, the user device 110 may include multiple processors, storage devices, input devices, output devices, communication interfaces, or a combination thereof.

The electronic processor 111 may include one or more microprocessors, application-specific integrated circuits (ASICs), or other suitable electronic devices. The storage device 112 includes a non-transitory, computer readable medium. For example, the storage device 112 may include a hard disk, an optical storage media, a magnetic storage device, ROM (read only memory), RAM (random access memory), register memory, a processor cache, or a combination thereof. The communication interface 116 sends data to devices or networks external to the user device 110, receives data from devices or networks external to the user device 110, or a combination thereof. For example, the communication interface 116 may include a transceiver for wirelessly communicating over one or more communication networks, such as a wide area network, such as the Internet, a local area network, such as Bluetooth™ network or Wi-Fi, and combinations or derivatives thereof. Alternatively or in addition, in some embodiments, the communication interface 116 includes a port for receiving a wire or cable, such as an Ethernet cable or a universal serial bus (USB) cable, to facilitate a connection to an external device or network. The input device 117 receives input from a user. For example, the input device 117 may be or include a keyboard, keypad, a mouse or trackball, a touchscreen, a microphone, a camera, or other input devices. The output device 118 provides output to a user. For example, the output device 118 may be or include a display, light emitting diodes (LEDs), a speaker, or other output devices. A touch screen, which combines display, input, and cursor-control functions may also be used.

The storage device 112 stores instructions executable by the electronic processor 111 to perform the functionality described herein. The storage device 112 may also store data used with or generated by executing instructions by the electronic processor 111. As noted, in the example, illustrated, the storage device 112 includes the operating system 113, the automated task selection application 114, and the training data creation application 115. The automated task selection application 114, executing on electronic processor 111, is configured to receive questions from a user through input device 117 and analyze the question using a natural language understanding application 119. It should be understood that the natural language understanding application 119 may be part of the automated task selection application 114 (as shown). Alternatively, the natural language understanding application 119 may be hosted on an external device, for example, a remote device 120. The remote device 120 communicates with the automated task selection application 114 through the communication interface 116 connected via a communication network 130. The natural language understanding application 119 analyzes the question using training data as described in more detail with respect to FIG. 2, to identify potential software tools and services that answer the user's question.

In one example, the training data creation application 115, executing on electronic processor 111, is configured to access a programming file repository 140 to extract programming file data and attributes. The training data creation application 115 is also configured to convert programming file data and attributes extracted from the programming file repository 140 into a format representing training data, for example, a file in a markup format or a database structure that may be used by the natural language understanding application 119. It should be understood that the programming file repository 140 may be a source code control system repository storing source code in files, and the source code files may be stored on multiple storage devices. It should also be understood that the programming file repository 140 may include files in object code or executable code containing attributes (for example, attributes describing what software functionality a module within a programming file or a programming file provides).

In the example illustrated, the training data creation application 115 is configured to store training data created from program data and attributes in a training data repository 150. Program data and attributes extracted from files in the programming file repository 140 are converted to a new format, as previously mentioned, before being stored as training data in the training data repository 150. It should be understood that the training data creation application 115 may monitor changes to the programming file repository 140 and, if changes to one or more programming files in the programming file repository 140 occur, or new programming files are added to the programming file repository 140, the changed or added programming files, or all the programming files in the repository, may be accessed, data and attributes extracted, and the extracted data and attributes converted to training data.

The example embodiment of system 100 accepts user input as one or more questions when searching for a software tool or service using input device 117. As previously described, the automated task selection application 114 executing on the electronic processor 111 communicates with the natural language understanding application 119 using training data stored in the training data repository 150 to output a list of potential solutions to output device 118. A user may then use input device 117 to choose a software tool or service from the list, or access the programming file repository 140 to update the programming file documentation or attributes of one or more of the software tools, services, or both. If the user chooses a software tool or service from the list, the user device 110 receives a corresponding input, and the system 100 provides a selection mechanism to allow the user to invoke or execute the software tool or service on the user device 110, the remote device 120, or both. If the user chooses to update the programming file documentation or attributes of one or more of the software tools or services, the system 100 provides a mechanism (for example, a link) to allow the user to open or otherwise access the programming file to update the documentation, attributes, or both. Once the programming file is opened or otherwise accessed, the user may update the programming file documentation or attributes by, for example, changing the documentation or attributes, entering additional documentation or attributes, or both.

The functionality performed by the training data creation application 115 is described as being performed locally on the user device 110. However, this functionality (or portions thereof) may similarly be performed remotely or otherwise in a distributed environment or fashion. For example, in some embodiments, the user device 110 executing the automated task selection application 114 on electronic processor 111 may communicate with a server (for example, a cloud service or platform) executing the training data creation application 115 or portions thereof. In yet another embodiment, the user device 110 may access the automated task selection application 114 executing on a server or cloud service. In still other embodiments, the user device 110 may execute the automated task selection application 114 locally and the training data repository 150 may be stored on storage device 112. Accordingly, it should be understood that the local configuration described in the present application is provided as one example and should not be considered as limiting.

The training data creation application 115 may use various modules, engines, or managers (each representing a set of executable instructions) to access programming files in the programming file repository 140, extract the programming file data and attributes, convert the programming file data and attributes to training data, and store the training data in the training data repository 150. It should be understood that these modules, engines, and managers may be combined and distributed in various forms to provide the functionality described herein, and FIG. 1 illustrates one example implementation.

Figure 2:
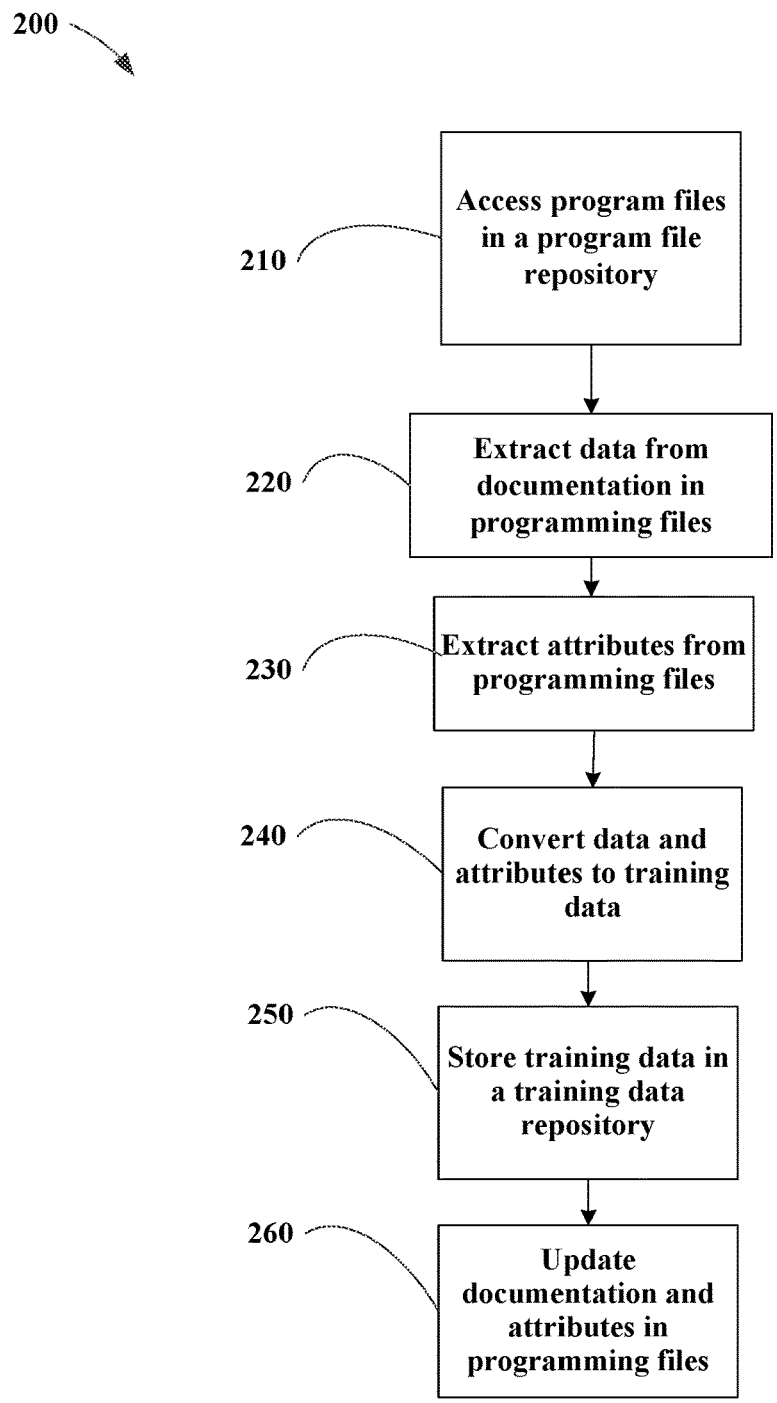
FIG. 2 is a flowchart illustrating a method of creating and updating training data using the system of FIG. 1.

FIG. 2 illustrates a method 200 performed by training data creation application 115 (as executed by the electronic processor 111 included in the user device 110, a separate computing device, for example a server, or a combination thereof) to access and extract data and attributes from programming files, convert the extracted data and attributes to training data, and store the training data in the training data repository 150. The method 200 includes the training data creation application 115 accessing the programming files in a programming file repository 140 (at block 210) across the communication network 130. In some embodiments, when the training data creation application 115 accesses the programming file, the programming files may be copied from the programming file repository 140 to temporary storage, for example in the storage device 112 on the user device 110. Accessing the programming files may involve the training data creation application 115 executing a remote copy command, for example "xcopy \\programfilerepository\programfilefolder MyCdrive:\" which copies files from the server "\\programfilerepository" in the "programfilefolder" directory to the "MyCdrive:\" on the user device 110. In other embodiments, the contents of the programming files, or portions of the programming files, may be accessed by streaming documentation from the programming files in the programming file repository 140 to the user device 110 across the communication network 130 by executing a command to open a stream which can then be used to access files, for example, "$stream=fopen ("ssh2.tunnel://$session/filerepository.com:1234", 'r');". In still other embodiments, training data creation application 115 may be located on a server or other device and the programming files in the programming file repository 140 may be located on the same server.

The method 200, illustrated in FIG. 2, also includes the training data creation application 115, executing on the electronic processor 111 in this example embodiment, extracting data from documentation in the programming files stored in the programming file repository 140 (at block 220). For example, documentation in the form of comments in source code may appear as:

```
///     <summary>
///     Uploads a local file to azure file share
///     </summary>
///     <example>
///         <remarks>
///             Uploads the local file "E:\Dumps\Jobs.dump" to the
remote directory "bkandoi\dump" in share "collaboration".
///             Note: this assumes that the parent directory
(bkandoi\dump) already exists. Use New-AzureRemoteDirectory to create
the folder if it does not exist.
///         </remarks>
///         <code>
///             Upload-AzureRemoteFile -Share collaboration
-RemotePath bkandoi\dump -LocalPath E:\Dumps\Jobs.dump
///         </code>
///     </example>
```

In this example, the training data creation application 115, executing on the electronic processor 111, extracts "Uploads a local file to azure file share" as data defining the functionality of the code module or the programming file (as a programming file may contain multiple code modules providing different functionality). In this example, the data defining the functionality of the code module or the programming file becomes training data that can be used by the natural language understanding application 119 to compare to a question input by the user. Example training data extracted here includes "Uploads file to file share" which is associated with this particular programming file as output. When a user inputs a question, for example the question "How do I upload a file to a file server?" the natural language understanding application 119 determines that the meaning of the question likely matches the meaning of the training data and therefore identifies the programming file as output in response to the user question. As previously mentioned, the ability of the training data to associate output with user input drives accuracy, and in this example the meaning of the question and the meaning of the data extracted from the file appears to match.

Continuing the previous example, in addition to the training data, the training data creation application 115 may extract "Uploads the local file "E:\Dumps\Jobs.dump" to the remote directory "user1\dump" in share "collaboration" as data explaining how the functionality works as well as "Upload-AzureRemoteFile-Share collaboration-RemotePath user1\dump-LocalPath E:\Dumps\Jobs.dump" as an example of how to use the module or the programming file functionality. These two example data items may be associated with the output in order to assist the user in determining if the programming file meets the functionality needs specified in the question.

Programming files may have attributes associated with the functionality provided by each of the programming files. The method 200, illustrated in FIG. 2 also includes the training data creation application 115, executing on the electronic processor 111 in this example embodiment, extracting attributes from documentation associated with the programming files stored in the programming file repository 140 (at block 230). For example, an executable programming file in the form of a dynamic link library (DLL), which contains at least one software tool or service that may be accessed by a user or another software application, includes attributes associated with the available functionality. Attributes provide a method of associating metadata (information about the computing environments in which the programming file operates), or declarative information (information about the functionality provided and how to use the programming file), with code examples, properties, and the like. Declarative information describes the functionality provided by the programming file or specifies a question the programming file answers. In one example, the declarative information is:

[NaturalLanguage("How do I upload a file to the share?", "Share:9:9")]

[NaturalLanguage("How do I serialize a web page", "Share: 9:9")]

Attributes associated with a programming file are extracted from programming files or programming file metadata. For example, an executable programming file may provide a function to serialize data, for example web pages, where serialization is the process of translating the data into a format that can be stored in a standard format allowing retrieval of the data using standard reading procedures. The training data creation application 115, executing on the electronic processor 111, may, in this example, extract attributes associated with the serialization function, which may include a description of the serialization function in the form "Serializes web pages that can be saved as a complete web page" as well as a description of how to use the function. Similar to the previous example, the training data creation application 115 may extract the description of the function to be used as training data and compared to user questions input using the input device 117 on user device 110. If the user inputs the question "How do I save a web page to local memory?" the natural language understanding application 119 used by the automated task selection application 114 determines the question and the training data match closely enough to identify the programming file as a potential answer to the user's question. It should be understood that programming file attributes extracted from the programming files in the programming file repository 140 may be in different formats and include different attributes, and, the attributes may be extracted using different methods, for example by using functions within the operating system 113 to query a registry file on the user device 110 to obtain attributes of an executable file registered on the user device 110.

The method 200, illustrated in FIG. 2 also includes the training data creation application 115, executing on the electronic processor 111 in this example embodiment, converting the data and the attributes extracted from programming files stored in the programming file repository 140 to training data (at block 240). The data and the attributes may be text strings associated with programming files, or modules within programming files, and may need to be modified or converted into a form or format that can be used as training data. For example, phrases from comments extracted from the programming files are placed in a data record, where a data record is a data structure that stores multiple data fields for a single data item (for example an address data item may be stored in a record that includes street, city, state, and zip code fields). In this example, the training data creation application 115 extracts data from a comment within the source code in a programming file (at block 220), and phrases from this data may be placed in multiple records as training data associated with the programming file as output. Continuing the previous example, the training data creation application 115, executing on the electronic processor 111, extracts "Uploads a local file to azure file share" and other data, as previously described, from programming file "UploadFile.cs" (a C # source code file), and the training data creation application 115 converts the extracted data to the following two records:

---

<Training Data Record 1>
training input field: "Uploads local file"
description field: "Uploads the local file "E:\Dumps\Jobs.dump" to the directory specified by the user"
example code field:"Upload-DestinationPath LocalPath E:\Dumps\Jobs.dump" output field: UploadFile.cs
<Training Data Record 2>
training input field: "Uploads file to file share"
description field: "Uploads the local file "E:\Dumps\Jobs.dump" to the remote directory "project1\dump" in share "collaboration ""
example code field:"Upload-Project1RemoteFile -Share collaboration -RemotePath project1\dump -LocalPath E:\Dumps\Jobs.dump"
output field: UploadFile.cs

---

In this example, the training data creation application 115 converts extracted data, in this example from comments in a programming file, into two records of training data, namely Training Record 1 and Training Record 2 (at block 240). Each training record includes a training input field, supporting information, and an output field. The training input field in this example contains data to compare to a user question and, if the comparison results in a likely match between the meaning of the training data and the user question, the data in the output field of the record is output to the user on, for example, output device 118. It should be understood that more than one training data record may be created from the same extracted data. It should also be understood that the converted data may be in forms or formats different from the example record described in this example embodiment and may, for example, be converted to data items inserted into a database or converted to other formats for storage.

As illustrated in FIG. 2, in this example embodiment the method 200 includes the training data creation application 115, executing on the electronic processor 111, storing training data in the training data repository 150 (at block 250). Data and attributes converted by the training data creation application 115 to training data (at block 240) may be stored in the training data repository 150 using the communication network 130 by sending all training data at once, portions of the training data periodically over time, or some other process for sending training data to the training data repository 150. For example, extracted data and attributes from one programming file are converted to training data and sent to the training data repository 150 before accessing the next programming file. In other embodiments, all extracted data and attributes may be converted to training data and then the training data stored in the training data repository 150, which may take the form of a database, as a sequence of database insertion commands sent across the communication network 130.

The training data creation application 115 stores training data in the training data repository 150 which allows the natural language understanding application 119 used by the automated task selection application 114 to output a list of answers to a user's question. As illustrated in FIG. 2, method 200 includes allowing the user to update the documentation and attributes in the programming files (at block 260). The training data creation application 115 generates a link in the supporting information to the programming file which the user may use to access the programming files output to the user. For example, in the previous examples, UploadFile.cs may be presented to the user as a hyperlink that allows the user to open the UpLoadFile.cs file and update the comments to make the description of the functionality of programming file more like the user's question. Such a change to a programming file in the programming file repository 140 notifies the training data creation application 115 that the training data should be updated. When the training data creation application 115 next updates the training data using method 200, the user change may be reflected in the training input, for example, and may better match user questions than the training input existing before the update.

Figure 3:
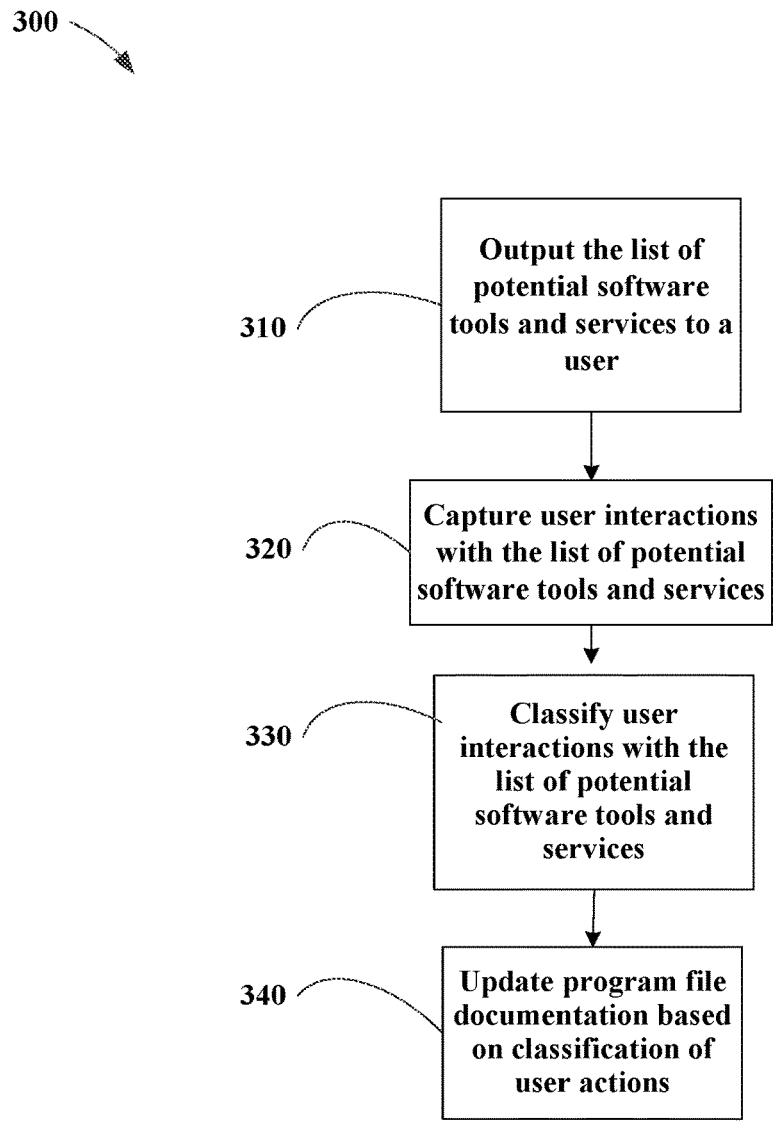
FIG. 3 is a flowchart illustrating a method of updating programming file documentation by capturing user feedback.

As illustrated in FIG. 3, a method 300 includes the automated task selection application 114 in communication with training data creation application 115 (as executed by the electronic processor 111 included in the user device 110, a separate computing device, for example a server, or a combination thereof) updates the programming files in the programming file repository 140, according to one embodiment. The automated task selection application 114 executing on electronic processor 111 outputs a list of potential software tools and services to the user (at block 310) on the output device 118. The user reviews the output list and interacts with the output by, for example, selecting a link using the input device 117 to view the source code of the programming file or execute the tool or service, actions captured by the automated task selection application 114 (at block 320). If the user decides to employ the software tool or service by selecting the link to execute a tool or service included in the list of potential outputs, the automated task selection application 114 classifies the software tool or service selected by the user as the desired output for the user question (at block 330). Alternatively, if the automated task selection application 114 detects that the user fails to select any of the links to potential software tools or services output to the output device 118, the lack of user interaction indicates the potential software tools or services in the list are undesired output that do not satisfy the user's question and the user action is classified as a failure of the automated task selection application 114 to select a software tool that meets the user's need (at block 330). For example, if the user selects a link to the software service "Upload-Destination-Path LocalPath E:\Dumps\Jobs.dump" the automated task selection application 114 classifies the result of the user interaction as indicating the selected output was a desired output for the user's question.

If the user's interaction is classified as a desired output, for example, as shown in FIG. 3, the text of the user's question may be used to update the comments in the source code for the programming file selected by the user, or added as a new attribute to the programming file, or both, by the training data creation application 115 (at block 340) thus creating programming file. While the user has the ability to access the source code of the programming file and the attributes of the programming file, whether stored in the source code or added as an attribute to the programming file, the training data creation application 115 may update either, or both (at block 340). Conversely, if the user fails to select any of the programming files in the list of potential software tools and services, the automated task selection application 114 adjusts the relationship, or strength of the relationship, between the user question 405 and the potential software tools and services in the list of outputs to the user to reflect that the selected tools or services did not appear to answer the user's question. In addition, or alternatively, the automated task selection application 114 may communicate with the training data creation application 115 to remove the user's question from comments in the source code of the programming file, or in the attributes associated with the executable file, or both, to reduce the likelihood of outputting the software tool or service in response to the same question again.

Figure 4:
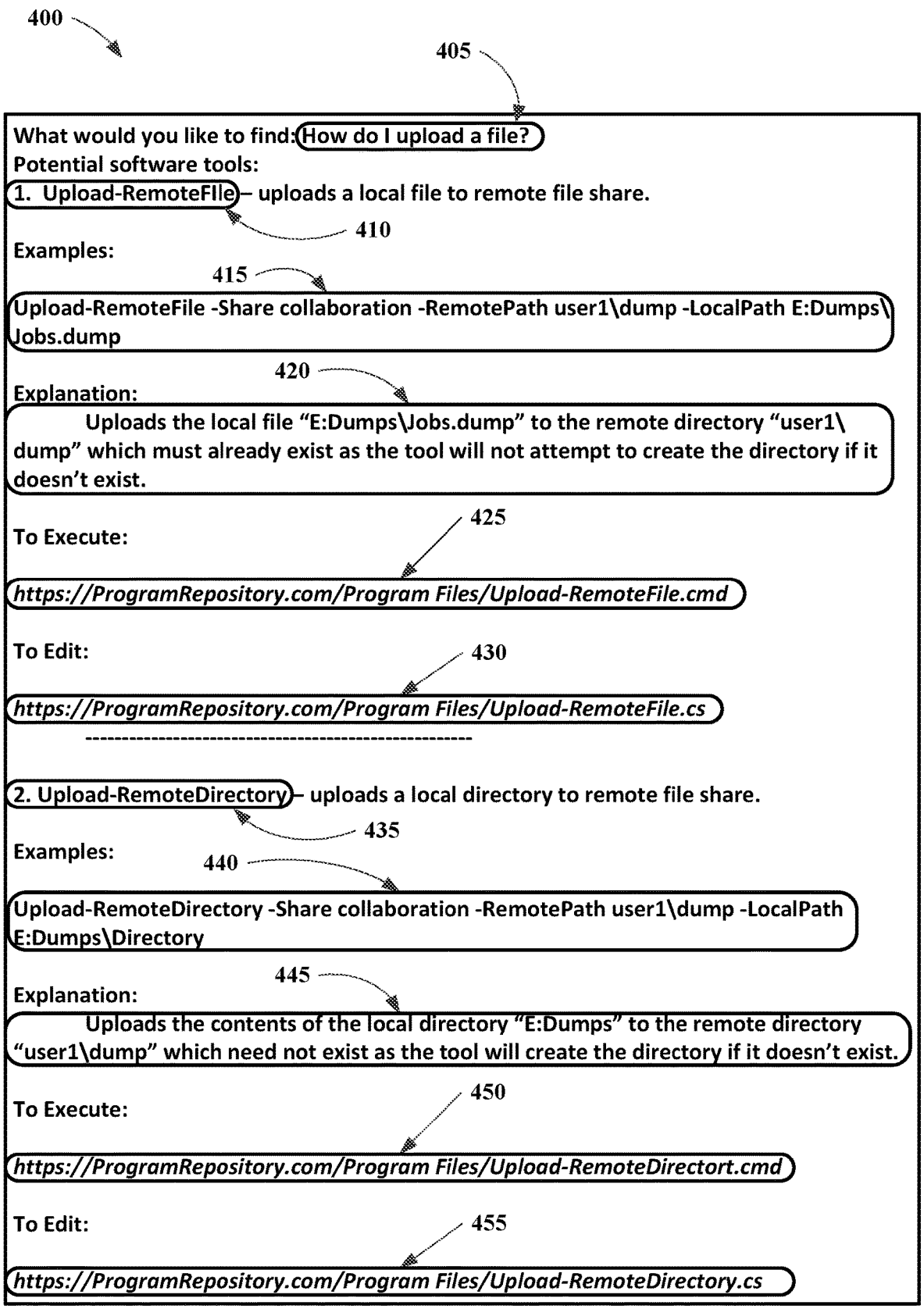
FIG. 4 illustrates a user interface accepting a developer's question and outputting a list of software tools that potentially solve the developer's needs.

FIG. 4 illustrates one embodiment of a user interface 400 including a list of potential software tools and services output in response to a user question 405. In this embodiment, the user question 405 input through the input device 117 is communicated to the automated task selection application 114 executing on the electronic processor 111. As previously described, the automated task selection application 114 communicates the user question 405 to the natural language understanding application 119 which identifies potential software tools and services to be communicated to the automated task selection application 114 and output to output device 118. The list of potential software tools and services includes software tool Upload-RemoteFile 410, an example use 415, an explanation 420, an execute link 425, and an edit link 430. In this example embodiment the user can highlight and copy the example use 415, or select the execute link 425 to execute the software tool Upload-RemoteFile 410, or select the edit link 430 to open the source file used to build the software tool Upload-RemoteFile 410 for editing of the comments or attributes, or any combination of these interactions with the user interface 400. As previously described, these interactions may be used to classify the software tool Upload-RemoteFile 410 as a desired output for the user question 405. Similarly, in this example embodiment, the user interface 400 includes another output in response to the user question 405, namely another software tool, Upload-RemoteDirectory 435. The user interface 400 includes an example use 440, an explanation 445, an executable link 450, and an edit link 455 associated with the software tool Upload-RemoteDirectory 435. The executable link 450 executes the software tool Upload-RemoteDirectory 435 and the edit link 455 open the source file used to build the software tool Upload-RemoteDirectory 435, as described previously for software tool Upload-RemoteFile 410.

Thus, embodiments described herein provide methods and systems for creating training data for automated task selection that provides a user with a list of potential software tools and services in response to questions input by a user. In some embodiments, automated task selection uses a natural language understanding system to select the software tools and services based on training data created from programming files. In some embodiments, comments in the source code of the programming files are extracted, converted to a training data, and stored in a repository usable by a natural language understanding system. Alternatively, or in addition, programming file attributes describing the functionality and use of the programming files are extracted, converted to training data, and stored allowing it to be used by the natural language understanding system. In some embodiments, the user updates the comments, attributes, or both, in a programming file to associate the user's question and the programming file based on the ability of the programming file to meet the user's need. In other embodiments, user interactions with the list of potential software tools and services and updates the programming files based on classification of user interactions as indicating a desired programming file was selected and output to the user.

Various features and advantages of some embodiments are set forth in the following claims.

What is claimed is:

1. A system for creating training data for a software application that executes automated tasks, the system comprising:
at least one electronic processor configured to:
access a file repository that contains programming files,
extract data from documentation associated with at least one of the programming files to generate extracted data, extract attributes associated with at least one of the programming files to generate extracted attributes, convert the extracted data and the extracted attributes to training data, store the training data in a training data repository, wherein the training data includes sample user input stored in a format that associates the sample user input with at least one desired output, and update the documentation and attributes in the programming files.

2. The system of claim 1, wherein the sample user input is associated with the at least one desired output in the form of a link to at least one of the programming files.

3. The system of claim 1, wherein the at least one electronic processor is further configured to:

update the documentation and attributes in the programming files, by outputting a link to at least one programming file and providing a mechanism allowing a user to input updates to the documentation and the attributes stored in the programming file.

4. The system of claim 1, wherein the at least one electronic processor is further configured to:

generate output to a user, monitor user interactions with the output to the user, and based on the user interactions, update the documentation and the attributes stored in the programming files.

5. The system of claim 1, wherein the at least one electronic processor is further configured to:

update the training data, detect when an update in the documentation and the attributes stored in the programming files occurs, and when the update occurs, extract the updated data and the updated attributes, convert the updated data and the updated attributes to training data, and store the training data in the training data repository.

6. The system of claim 1, wherein the at least one electronic processor is further configured to:

store a new version of the training data in the training data repository, detect when at least one programming file is updated, and when the at least one programming file is updated, extract the data and the attributes, convert the data and the attributes to training data, and store the training data in the training data repository.

7. The system of claim 1, wherein the at least one electronic processor is further configured to:

detect when a user does not select a link to at least one programming file, and when no link is selected, adjust an association between sample user input and desired output.

8. A method of creating training data for a software application that executes automated tasks, the method comprising:

accessing, with one or more electronic processors, a file repository that contains programming files;

extracting, with the one or more electronic processors, data from documentation associated with at least one of the programming files to generate extracted data;

extracting, with the one or more electronic processors, attributes associated with at least one of the programming files to generate extracted attributes;

converting, with one or more electronic processors, the extracted data and the extracted attributes to training data;

storing the training data in a training data repository, wherein the training data includes sample user input stored in a format that associates the sample user input with at least one desired output, and updating the documentation and attributes in the programming files.

9. The method of claim 8, wherein the at least one programming file is a source code file and wherein extracting data from documentation associated with the at least one programming file includes extracting comments placed within the source code file.

10. The method of claim 9, wherein the comments include a description the functionality provided by the at least one programming file, a description of how to use the at least one programming file, and an example use of the at least one programming file.

11. The method of claim 8, wherein converting, with one or more electronic processors, the extracted data and the extracted attributes to training data includes, for each function in the at least one programming file, creating training data.

12. The method claim 11, wherein the training data includes a description of the functionality provided by the programming file, a description of how to use the function provided by the programming file, an example use of the function, a link to an executable programming file, and a link to a source code file of the programming file.

13. The method of claim 8, wherein the at least one of the programming files is a file containing at least one function and wherein extracting attributes from the at least one of the programming files includes:

extracting attributes from documentation stored in association with the at least one function of the programming files, specifying, for the at least one function, a description of the functionality the at least one of the programming files provides, a description of how the at least one of the programming files provides the functionality, and an example of use of the functionality in the at least one of the programming files.

14. The method of claim 8, wherein storing extracted data and extracted attributes includes formatting and storing the extracted data and the extracted attributes in a training data repository that can be used as training data for a natural language understanding application.

15. The method of claim 8, wherein updating the documentation and attributes includes:

providing a link to the source code file containing the attributes, receiving user input to alter the attributes in the source code file, and storing the updated attributes with the at least one programming file.

16. The method of claim 8, wherein updating the documentation and attributes includes:

outputting, by the software application, a list of potential software tools and services to the user, capturing at least one user interaction with the list of potential software tools and services output, classifying the at least one user interaction as indicating at least one potential software tool or service in the list of potential software tools and services output was a desired output, otherwise classifying the at least one user interaction as indicating an undesired output, and updating the documentation and attributes in the programming file based on classification of the at least one user interaction.

17. The method of claim 8, wherein updating the documentation and attributes in the programming file includes adding at least one question to the documentation or attributes of the functionality provided by the programming file.

18. The method of claim 8, wherein updating the documentation and attributes in the programming file includes updating text specifying the functionality provided by the programming file.

* * * * *